US011919139B2

(12) United States Patent
Belyakov et al.

(10) Patent No.: US 11,919,139 B2
(45) Date of Patent: Mar. 5, 2024

(54) POWER TOOL FALL PROTECTION DEVICE

(71) Applicant: GRIPGUARD INC., Milton (CA)

(72) Inventors: Gleb Belyakov, Oakville (CA); Valeri Crivoi, Milton (CA)

(73) Assignee: GRIPGUARD INC., Milton (CA)

( * ) Notice: Subject to any disclaimer, the term of this patent is extended or adjusted under 35 U.S.C. 154(b) by 0 days.

(21) Appl. No.: 17/730,773

(22) Filed: Apr. 27, 2022

(65) Prior Publication Data

US 2022/0371173 A1 Nov. 24, 2022

Related U.S. Application Data

(60) Provisional application No. 63/180,846, filed on Apr. 28, 2021.

(51) Int. Cl.
*B25F 5/02* (2006.01)
*B25D 17/04* (2006.01)

(52) U.S. Cl.
CPC ................ *B25F 5/02* (2013.01); *B25D 17/04* (2013.01)

(58) Field of Classification Search
CPC .................................. B25F 5/02; B25D 17/04
See application file for complete search history.

(56) References Cited

U.S. PATENT DOCUMENTS 5,692,574 A * 12/1997 Terada ................ B25D 17/043 173/162.2
6,279,741 B1 * 8/2001 Arvin .................. F16M 13/022 206/349
7,341,173 B1 * 3/2008 Arnold .................... B25C 1/047 227/120
2008/0025017 A1 * 1/2008 Tadokoro ................ B25F 5/021 362/119
2008/0032190 A1 * 2/2008 Furuta ................. H01M 50/244 429/163
2008/0066939 A1 * 3/2008 Manacorda ............. B25F 5/006 173/210
2010/0181085 A1 * 7/2010 Imada ....................... B25F 5/02 173/162.2
2016/0271782 A1 * 9/2016 Piritidis .................... B25C 1/08
2017/0252833 A1 * 9/2017 Bayona Salazar ...... B25F 5/026
2018/0001444 A1 * 1/2018 Matsushita ............. B25B 23/18
2018/0304454 A1 * 10/2018 Kawakami ............. B23Q 11/08
2019/0160646 A1 * 5/2019 Hoossainy .......... H04W 64/003
2020/0280031 A1 * 9/2020 Zhu ..................... H01M 10/488
2021/0197356 A1 * 7/2021 Chung .................... B25F 5/008
2021/0384579 A1 * 12/2021 Holubarsch ......... H01M 50/207
2022/0176511 A1 * 6/2022 Greitmann ............ B24B 23/005
2022/0285774 A1 * 9/2022 Muir ......................... B25F 5/02

FOREIGN PATENT DOCUMENTS

CN 112318439 A * 2/2021 ............... B25D 1/04
JP 2017144523 A * 8/2017

* cited by examiner

*Primary Examiner* — Anna K Kinsaul
*Assistant Examiner* — Lucas E. A. Palmer
(74) *Attorney, Agent, or Firm* — Bhole IP Law; Anil Bhole; Marc Lampert

(57) ABSTRACT

A power tool fall protection device comprises a sleeve dimensioned to pass over one end of the tool. The sleeve has cheeks projecting from opposite sides of the sleeve to engage a substrate and tabs on the sleeve to inhibit movement of the sleeve along the tool.

16 Claims, 3 Drawing Sheets

POWER TOOL FALL PROTECTION DEVICE

FIELD OF THE INVENTION

The present invention relates to a fall protection device for a power tool

DESCRIPTION OF THE PRIOR ART

The construction industry makes extensive use of power tools to facilitate building of structures. The tools are typically bulky and heavy and therefore are frequently placed on work surfaces when not in use. When power tools are used at elevated locations there is a risk of the tools falling and posing a significant danger to those below.

One such environment is in roofing where shingles are secured to an inclined roof substrate using nails or staples. A power nailer is used to drive the nails with the nails supplied from a cartridge incorporated in to the nailer. The nailer typically has a power cylinder that drives a blade past the cartridge to separate a nail and force it in to the substrate. A handle is secured to the cylinder and a retractable nose guides the nail and provides a safety interlock to prevent operation of the nailer unless the nose is positioned against the substrate.

The force to drive the nail is derived from the power cylinder which therefore is relatively large and cylindrical. The nose that guides the nail is relatively small compared to the cylinder so that when the nailer is placed on the substrate the cylinder supports the nailer and holds the nose clear of the substrate. The cylinder presents a relatively smooth surface and since the substrate is typically a sheet material such as plywood or oriented strand board (OSB), there is a tendency for the nailer to slide along the surface of the substrate. The roof structure is usually inclined in the order of 20 degrees and often at angles greater than 30 degrees and so there is a significant risk that the nailer will slide down the roof and fall on workers below.

It is an object of the present invention to provide a furniture system that obviates or mitigates the above disadvantages.

SUMMARY OF THE INVENTION

In general terms the present invention provides a power tool fall protection device comprising a sleeve dimensioned to pass over one end of the tool. The sleeve has cheeks projecting from opposite sides of the sleeve to engage a substrate and sops on the sleeve to inhibit movement of the sleeve along the tool.

Preferably the sleeve is integrally molded from a plastics material such as a thermoplastic elastomer (TPE) that provides a high friction surface and as a further preference the sleeve is molded with a thin wall to minimise the mass of the sleeve.

BRIEF DESCRIPTION OF THE DRAWINGS

The features of the invention will become more apparent in the following detailed description in which reference is made to the appended drawings wherein.

DETAILED DESCRIPTION OF THE INVENTION

Figure 1:
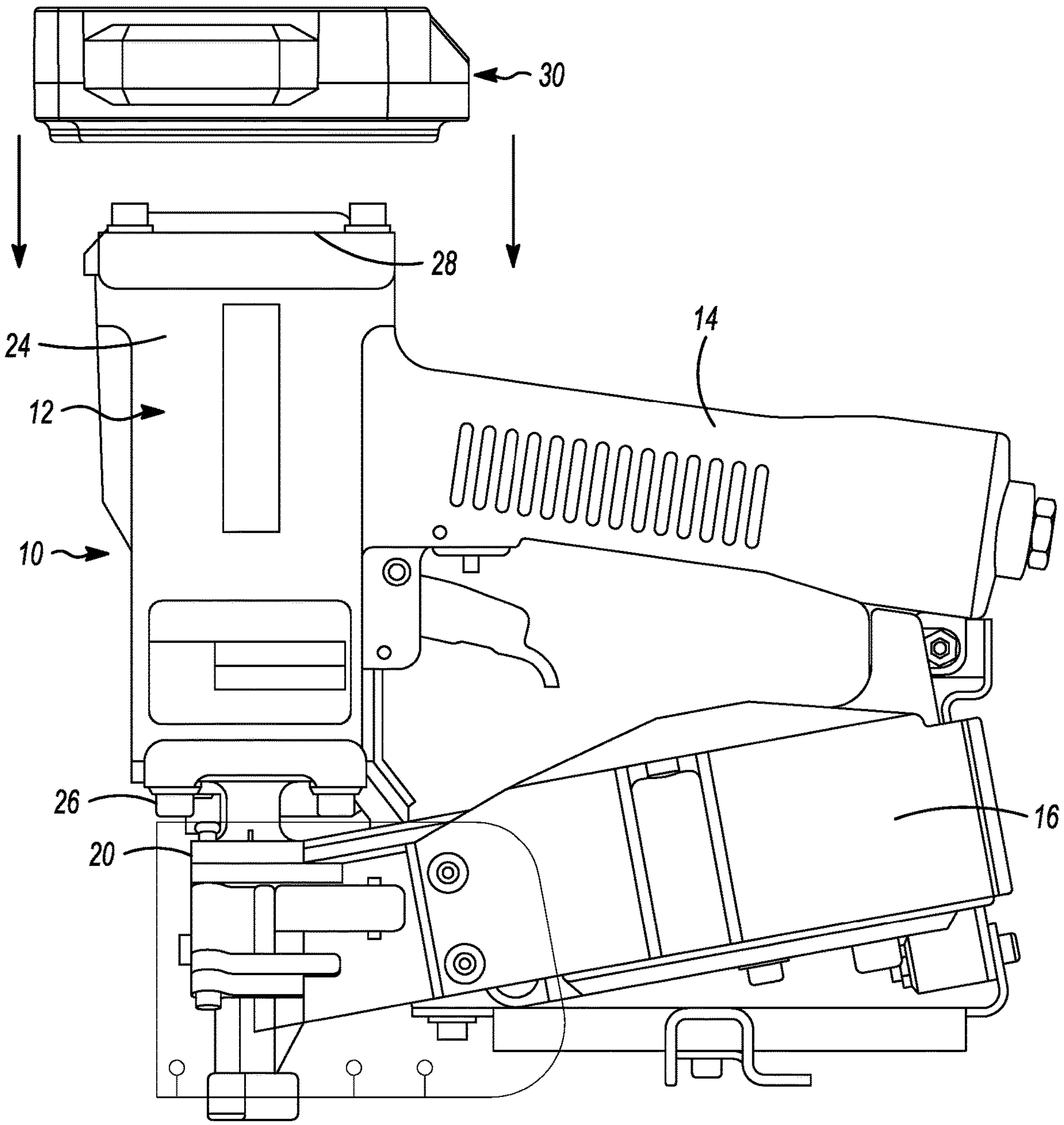
FIG. 1 is an exploded side view of a power nailer and sleeve.

Referring firstly to FIG. 1, a power nailer 10 has a power unit 12, a handle 14 secured to the power unit 12 and a circular nail cartridge 16. The power unit 12 is connected to a nose 20. The nose 20 contains a blade (not shown) that is driven by the power unit 12 to discharge nails delivered to the nose 20 from the cartridge 16.

The power unit 12 has an outer wall 24 that is cylindrical and transitions through a tapered section 26 at its lower end to the nose 20. A piston (not shown) is slidably mounted within the cylindrical wall 24 and connected to the blade to discharge nails. A cylinder head 28 is secured to the outer wall 24 to enclose the piston. The details and operation of the power nailer 10 is well known in the art and such nailers are available from a variety of manufacturers to drive nails of different lengths and gauges. Power for the nailer may be pneumatic with compressed air provided from a hose 22, or electric supplied by a battery, again as is well known in the art. The specific details of the construction are well known and will differ slightly according to model and manufacturer.

Figure 2:
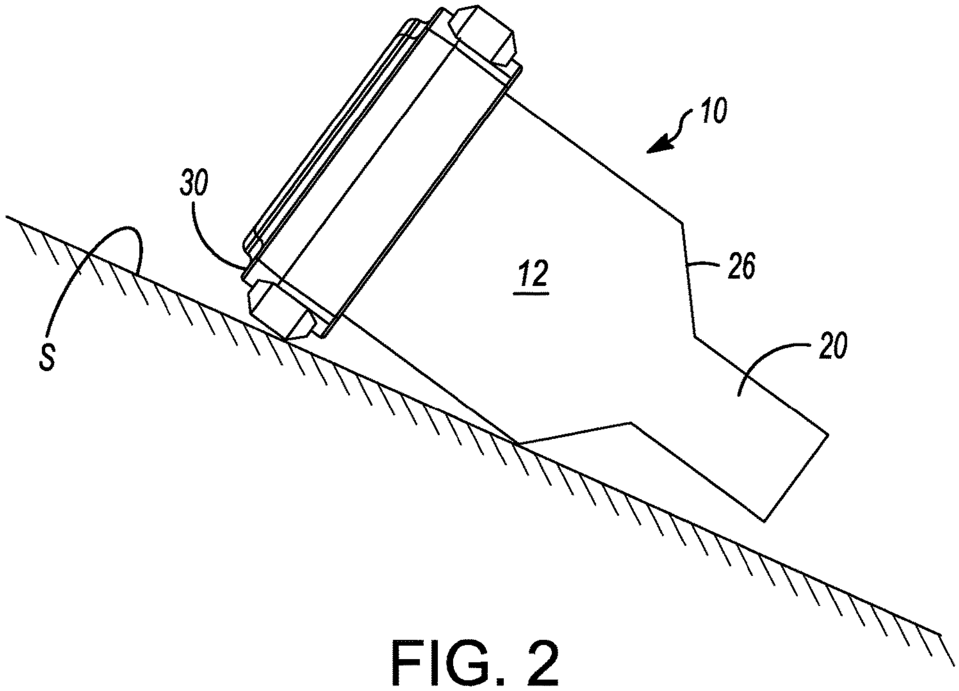
FIG. 2 is an end view of a nailer with sleeve attached lying on a roof.
Figure 3:
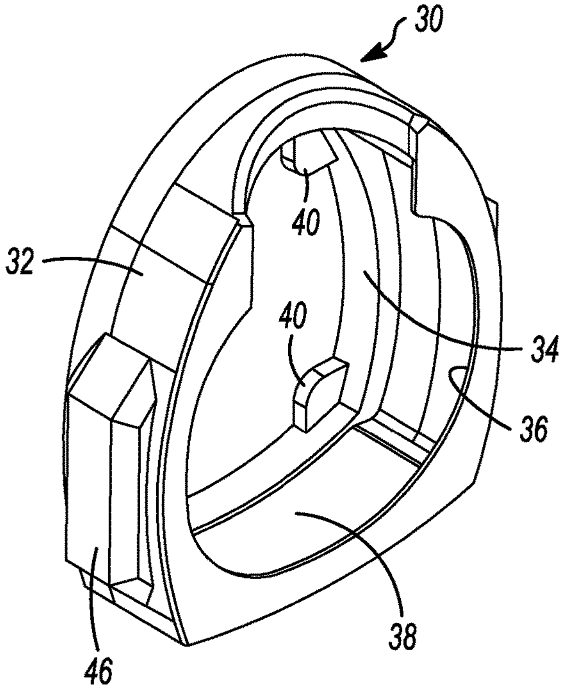
FIG. 3 is a bottom perspective view of the sleeve shown in FIG. 1.
Figure 4:
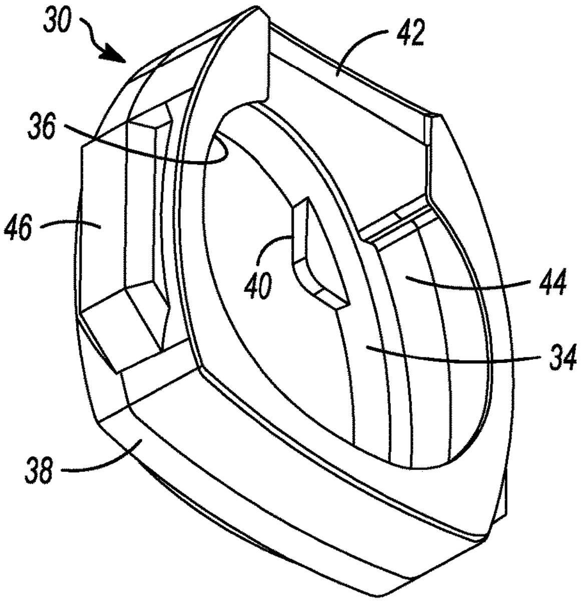
FIG. 4 is a further bottom perspective view of the sleeve of FIG. 3.
Figure 5:
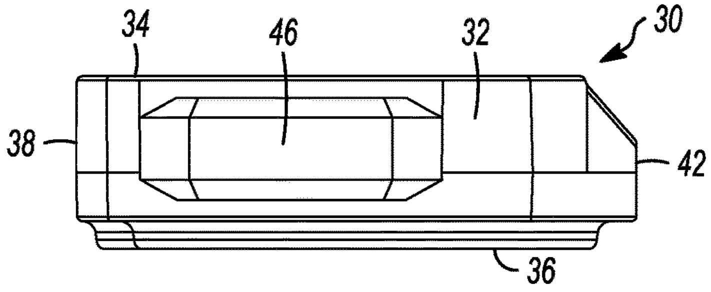
FIG. 5 is a side view of the sleeve of FIG. 3.
Figure 6:
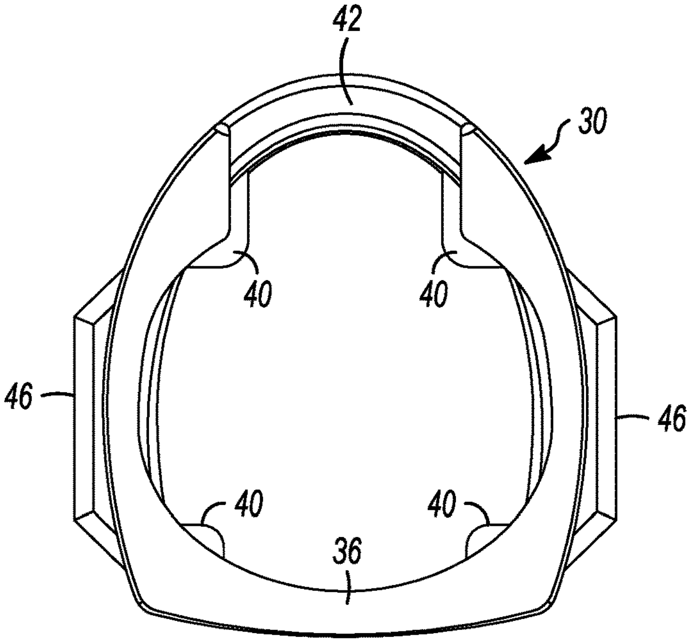
FIG. 6 is a bottom view of the sleeve of FIG. 3.
Figure 7:
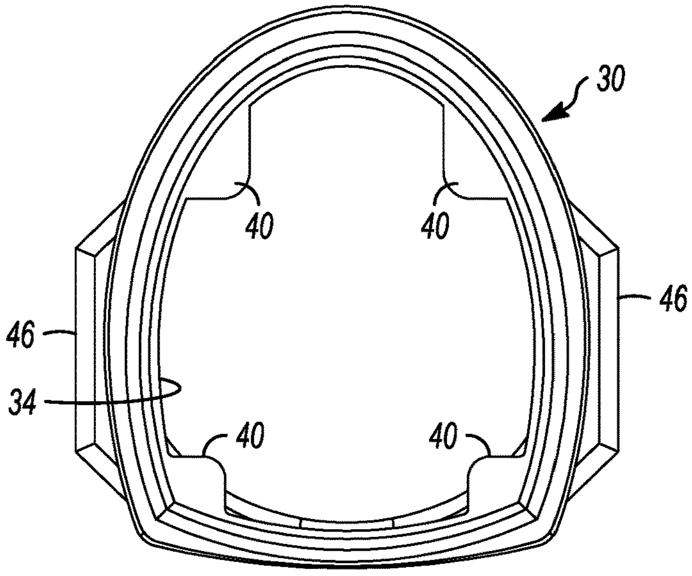
FIG. 7 is a top view of the sleeve of FIG. 3.

When not in use, the power nailer 10 is laid on its side with the outer wall 24 in contact with the substrate S, shown in FIG. 2 which is inclined. As noted above, the cylindrical outer wall 24 offers little resistance to sliding along the substrate S. To inhibit sliding, a sleeve 30 is fitted around the upper end of the power unit 12 as shown in FIG. 1 and FIG. 2.

The sleeve 30 is integrally molded from a resilient plastics material such as a thermoplastic elastomer (TPE) which offers a moderate degree of flexibility, good dimensional stability, wear resistance, good low temperature flexibility and impact resistance. The sleeve 30 is shown in FIGS. 3 to 7 and has a peripheral wall 32 that extends between top and bottom flanges 34, 36 respectively. The peripheral wall is generally arcuate in plan view with a larger radius front panel 38 and has a substantially uniform thickness in the order of ⅛ in. The relatively thin wall construction of the sleeve minimises the mass of the sleeve and does not adversely affect the use of the nailer over extended periods.

The upper flange 34 has four tabs 40 projecting inwardly from the flange 34 to overlie the cylinder head 28 when fitted to the power nailer 10. The lower flange 36 has an inner dimension slightly less than the diameter of the cylindrical outer wall 24 so as to be a close friction fit on the power unit 10. The lower flange 36 terminates at an arcuate recess 42 formed in the peripheral wall 32 which is dimensioned to fit around the handle 14.

The peripheral wall 32 is formed with a pair of pockets 44 located at diametrically opposite locations on the sleeve 30. The pockets 44 are located between the front wall 38 and the recess 42 so as to project laterally from the sleeve 30. The end walls of the pockets 44 provide cheeks 46 that extend radially outwardly a sufficient distance to elevate the power unit 12 from the substrate as shown in FIG. 2. In a typical unit, the cheeks project in the order of 5 cm. from the peripheral wall 32 and extend along the peripheral wall in the order of 8 cm. The pockets 44 are dimensioned to provide sufficient rig to the cheeks 48 to support the mass of the power unit 12.

The outer surface of the peripheral wall 32 and cheeks 44 is molded with a textured or roughened finish, such as a pebbled finish, to provide a higher coefficient of friction.

In use, the sleeve 30 is slid over the upper end of the power unit 12 until the tabs 40 engage the cylinder head 28. The sleeve 30 is oriented on the power unit 12 by the engagement of the handle 14 in the recess 42 so that rotation of the sleeve 30 is inhibited. In that position, the cheeks 46 project laterally from the power unit 12. The lower flange 36 frictionally engages the outer wall 24 and preferably engages undercut portions of the outer wall or around the underside of the handle 14 to inhibit longitudinal displacement of the sleeve 30.

With the sleeve 30 in place, the power nailer 10 may be used in a normal manner to drive nails as the sleeve 30 does not interfere wit the operation of the nailer 10. When the power nailer 10 is laid on to the substrate S, the cheeks 46 engage the substrate S and elevate the power unit. The elevation of the power unit 12 causes a point contact at the lower portion of the power unit 12 and the roughened surface of the cheeks 44 provides additional resistance to movement along the substrate. The tendency for the nailer 10 to slide from the substrate is thus mitigated.

The sleeve 30 may be removed from the power unit 12 by simply disengaging the lower flange 36 and pulling the sleeve longitudinally to allow servicing of the nailer as required. The mass of the sleeve 30 is relatively small so the balance and overall weight of the nailer is not affected.

It will be apparent that the overall dimensions of the sleeve 30 will vary between different models of power nailer and the location of the tabs 40 and the flanges 34, 36 may also vary from model to model.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A power tool fall protection device comprising a sleeve dimensioned to pass over one end of the tool, said sleeve having cheeks projecting from opposite sides of the sleeve to engage a substrate and tabs on the sleeve to inhibit movement of the sleeve along the tool, said cheeks having a textured finish molded on an outwardly directed surface to provide a high friction surface.

2. A power tool fall protection device according to claim 1 wherein said sleeve is integrally molded from a plastics material.

3. A power tool fall protection device according to claim 2 wherein said sleeve is molded with a wall having a uniform thickness to minimise the mass of the sleeve.

4. A power tool fall protection device according to claim 2 wherein said sleeve is molded from a thermoplastic elastomer (TPE).

5. A power tool fall protection device according to claim 1 wherein said sleeve has a pair of flanges and a peripheral wall extending between flanges.

6. A power tool fall protection device according to claim 5 wherein one of said flanges has an aperture to permit said flange to be slid over said one end of said tool with an interference fit to hold said sleeve on said tool.

7. A power tool fall protection device according to claim 6 wherein an other of said flanges is dimensioned to overlie said one end of tool and inhibit further movement of said sleeve along said tool.

8. A power tool fall protection device according to claim 6 wherein a recess is provided in said one flange to accommodate a handle of said power tool.

9. A power tool fall protection device according to claim 5 wherein said peripheral wall is formed with a pair of pockets located at diametrically opposite locations on said sleeve.

10. A power tool fall protection device according to claim 9 wherein said pockets project laterally from said sleeve.

11. A power tool fall protection device according to claim 10 wherein end walls of said pockets provide said cheeks.

12. A power tool fall protection device according to claim 11 wherein said end walls of said pockets are located 5 cm. from said peripheral wall.

13. A power tool fall protection device according to claim 12 wherein said pockets extend 8 cm. about said peripheral wall.

14. A power tool fall protection device for a nailer having a cylindrical power unit and a handle extending radially from the power unit, said power tool fall protection device having a sleeve dimensioned to pass over one end of said cylindrical power unit, said sleeve having a pair of flanges and a peripheral wall extending between said flanges, one of said flanges having an aperture dimensioned to pass over said cylindrical power unit and engage an outer surface of said cylindrical power unit and another of said flanges overlieing an end of said cylindrical power unit to inhibit further movement of said sleeve along said cylindrical power unit, said peripheral wall having a pair of pockets projecting laterally outwardly from said cylindrical power unit and each terminating with an outwardly directed end wall to provide a pair of oppositely directed cheeks each laterally spaced from said peripheral wall to engage a substrate.

15. A power tool fall protection device according to claim 14 wherein said sleeve is integrally molded from a plastics material and has a uniform wall thickness.

16. A power tool fall protection device according to claim 15 wherein said a recess is formed in said one flange to accommodate said handle.

* * * * *